United States Patent [19]

Söderström

[11] Patent Number: 4,627,882

[45] Date of Patent: Dec. 9, 1986

[54] METHOD OF MAKING A ROTARY DRILL BIT

[75] Inventor: Gunnar T. Söderström, Nickelgatan, Sweden

[73] Assignee: Santrade Limited, Lucerne, Switzerland

[21] Appl. No.: 727,789

[22] Filed: Apr. 26, 1985

Related U.S. Application Data

[62] Division of Ser. No. 442,005, Nov. 16, 1982.

[30] Foreign Application Priority Data

Dec. 15, 1981 [SE] Sweden ............................ 8107488

[51] Int. Cl.$^4$ .............................................. C21D 1/09
[52] U.S. Cl. ...................... 148/14; 148/152; 148/154; 76/107 R; 29/148.4 A
[58] Field of Search ............... 76/108 A, 108 R; 29/148.4 A, 148.4 L; 148/13.1, 14, 150, 154, 152

[56] References Cited

U.S. PATENT DOCUMENTS

| | | | |
|---|---|---|---|
| 3,235,316 | 2/1966 | Whanger | 384/95 |
| 3,275,389 | 9/1966 | Neilson et al. | 384/95 |
| 3,476,446 | 11/1969 | Neilson | 384/95 |
| 3,477,884 | 11/1969 | Schlicht | 148/150 |
| 3,866,987 | 2/1975 | Garner | 384/95 |
| 3,995,917 | 12/1976 | Quinlan | 308/8.2 |
| 4,021,084 | 3/1977 | Garner | 384/95 |
| 4,043,847 | 8/1977 | Just | 148/146 |
| 4,109,974 | 8/1978 | Svarnstrom | 384/95 |

FOREIGN PATENT DOCUMENTS 141435  4/1980  German Democratic Rep. .

Primary Examiner—Christopher W. Brody
Attorney, Agent, or Firm—Burns, Doane, Swecker & Mathis

[57] ABSTRACT

A rotary drill bit comprising a roller cutter (13) rotatably carried over a bearing system, which comprises a friction bearing (14). For purposes of ensuring sufficient hardness of the cooperating friction surfaces and lubrication thereof and optimizing cutting ability and fatigue resistance the bearing surface (28) of the roller cutter (13) is surface-hardened by means of a thermal hardening method and provided with a solid lubricant (27), and the bearing surface (29) of the bearing pin (12) is provided with a wear resistant deposit having higher wearability than the surface-hardened bearing surface.

9 Claims, 3 Drawing Figures

METHOD OF MAKING A ROTARY DRILL BIT

This application is a division of application Ser. No. 442,005, filed Nov. 16, 1982.

This invention relates to a rotary drill bit of the type comprising at least one bearing pin projecting from the bit body. The bearing pin carries rotatably a roller cutter over a bearing system which comprises at least one friction bearing. The friction bearing has cooperating bearing surfaces machined in the roller cutter and on the bearing pin. The invention also relates to a method of making the improved rotary drill bit.

Rotary drill bits of this type are frequently made of case-hardening steel, which means that the bearing races—and sometimes certain outer sludge grooves on the roller cutter—are to be carburized. The case-hardening means that there is required such a choice of material that the strength of the roller cutter is sufficient to withstand the stresses arising during drilling, that the bearing races do withstand fatigue failure and that the core material is such that insert holes can be machined with cutting tools after the hardening. In practice it has been found that it is difficult to simultaneously achieve all these aims.

The object of this invention is to provide a rotary drill but in which the required hardness of the bearing races is ensured while simultaneously optimizing the cutting ability after hardening and the fatigue resistance. At the same time the invention also seeks to ensure that a satisfactory lubrication of the bearing surfaces is maintained. The above and other objects are attained by giving the invention the characterizing features stated in the claims.

The invention is described in detail in the following description with reference to the accompanying drawings in which one embodiment is shown by way of example. It is to be understood that this embodiment is only illustrative of the invention and that various modifications thereof may be made within the scope of the claims.

In the drawings, FIG. 1 shows in section one embodiment of a rotary drill bit according to the invention.

Figure 1:
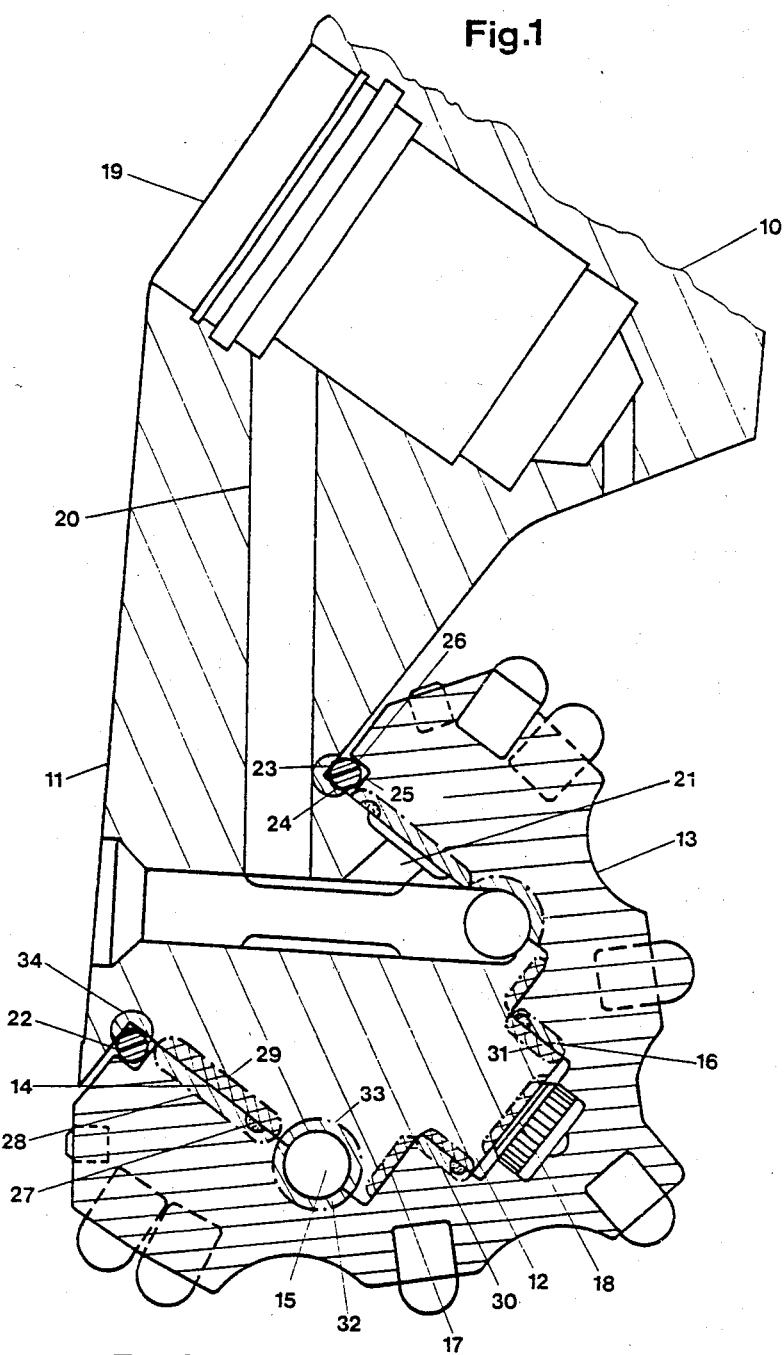

In FIG. 1 the lowermost portion of the head of a roller bit for rotary drilling in rock and earth formations is designated 10. The bit head 10 comprises in conventional manner three separate legs. In FIG. 1 only one leg is shown and designated 11. The lowermost portion of the leg 11 is formed as a bearing pin 12 upon which a roller cutter 13 provided with cutting means, such as hard metal inserts, is rotatably carried over a bearing system comprising a radial friction bearing 14, a ball bearing 15, a radial friction bearing 16 and axial friction bearings 17,18.

Lubricant is supplied to the bearing system through passages 20,21 from a lubricant reservoir 19 in the leg 11. An annular sealing means 22 in form of an O-ring is disposed in a gap between the leg 11 and the roller cutter 13 for sealing the bearing system. The O-ring 22 is intended to sealingly engage mutually transverse surfaces 23,24 on the leg 11 and mutually transverse surfaces 25,26 on the roller cutter 13. Suitably, the O-ring 22 is provided with a friction reducing material on its radially inner surface which is intended to cooperate with the surfaces 23,24, thereby ensuring that relative movement arises only between the O-ring and the leg 11. The O-ring 22 is described in detail in Swedish patent application No. 80 02882-2.

Figure 2:
FIG. 2 shows the designation of a portion of the rotary drill bit being hardened by means of thermal hardening method.

In the rotary drill bit according to the invention the cooperating bearing surfaces of the friction bearings 14, 16 are machined directly in the roller cutter 13 and on the bearing pin 12, respectively. According to the invention the bearing surface of the friction bearing 14 in the roller cutter 13 is surface-hardened by means of a thermal hardening method and provided with an inlay of a solid lubricant 27. In the preferred embodiment the thermal hardening method is high frequency induction heating, so-called HF surface hardening (high frequency surface-hardening). Within the inventive concept, however, also other thermal hardening methods, such as laser hardening and flame hardening by gas, may be used. By "thermal hardening" is to be understood a hardening method in which no chemical additions are made. Suitably, the case depth of the thermal surface-hardening is in the order of 0.2-3 mm. In FIG. 1, the hardened portion is designated 28. FIG. 2 illustrates in general the designation of a portion of the roller cutter 13, such as the portion 28, which is HF surface-hardened. In a preferred embodiment the lubricant 27 is a solid composite lubricant comprising molybdenum disulfide and a resin adhesive, preferably an epoxy resin adhesive. The lubricant contains 5-20 vol % molybdenum disulfide with preference for percentage rates in the order of 10-35. Within the inventive concept it is to be understood that other solid lubricants, such as silver and silver alloys, may be used.

Figure 3:
FIG. 3 shows the designation of a wear resistant material applied on the rotary drill bit.

The lubricant 27 is applied in suitably shaped grooves or recesses in the HF surface-hardened bearing surface; the recesses can for instance be shaped according to any of the designs shown in U.S. Pat. No. 3,235,316. According to the invention, further, as wear resistant material, such as Stellite (Trade Mark), is applied on the bearing surface of the friction bearing 14 on the bearing pin 12; the wear resistant material being applied on at least the lower load bearing fraction of the bearing pin, i.e. the lower portion thereof in FIG. 1. The wear resistant material, which has higher wearability than the HF surface-hardened portion 28, is designated 29 in FIG. 1. FIG. 3 illustrates in general the designation of a portion of the bearing pin 12 or the leg 11, such as the portion 29, which comprises the wear resistant material. Due to the fact that the lubricant 27 is applied in the less wear resistant HF surface-hardened bearing surface in the roller cutter 13 a continuous exposure of lubricant is obtained during drilling, thereby ensuring a satisfactory lubrication of the bearing surfaces. As to the wear resistant material it is important that a material is chosen which has high high temperature strength, i.e. a material which to a high degree, at least better than the HF-hardened surface, maintains its hardness under the increased temperatures arising at the bearing surfaces during drilling. In the preferred embodiment Stellite (Trade Mark) is used, since this material maintains its hardness better than the HF-hardened steel at high temperatures.

In analogous manner with the friction bearing 14, the forward friction bearing 16 is provided with a HF surface-hardened portion 30 in the roller cutter 13 having inlays of lubricant, and a wear resistant deposit 31 on the bearing pin 12.

In the preferred embodiment the bearing races of the ball bearing 15 are HF surface-hardened both in the roller cutter 13 and on the bearing pin 12. In FIG. 1, the surface-hardened portions are depicted by the reference numerals 32 and 33. In the axial friction bearings 17,18 the bearing surfaces on the bearing pin 12 are provided with a wear resistant deposit.

In the preferred embodiment, as previously mentioned, relative movement is pursued between the sealing ring 22 and the leg 11. In order to ensure satisfactory sealing against the surfaces 23,24 also these surfaces together with the underlying portion 34 are HF surface-hardened.

In the preferred embodiment, the roller cutter and the bearing pin are tough-hardened prior to the HF surface-hardening and the deposition of wear resistant material, respectively. As to the roller cutter, the HF surface-hardening of the bearing races therein means that a tough-hardening steel can be used having a carbon percentage exceeding 0.30%. Preferably, an annealing resistant Mo-alloy is used having a carbon percentage of about 0.45%. The tough-hardening means that the core material can be chosen such that the drilling ability thereof upon hardening and the fatigue resistance thereof can be optimized. When using the previously mentioned case depths the fatigue resistance and the machining ability with cutting tools are not effected by the HF surface-hardening.

A rotary drill bit of the type in question does often work in highly corrosive milieu. In order to obtain corrosion resistant sealing surfaces of the O-ring 22 so as to ensure satisfactory sealing, the bearing pin 12 and the bit body 10,11 are made of a steel having a carbon percentage exceeding 0.25%, a molybdenum percentage exceeding 0.15%, a chromium percentage exceeding 0.80% and a nickel percentage exceeding 1.50%. Preferably, an air-hardening steel is used having a carbon percentage of about 0.35%, a molybdenum percentage of about 0.25%, a chromium percentage of about 1.30% and a nickel percentage of about 2.80%. Preferably, the tough-hardening of the bit body 10,11 is made in connection with the forging of the casting.

I claim:

1. A method of making a rotary drill bit comprising forming cooperating friction bearing surfaces on a bearing pin and a roller cutter rotatably carried thereon, the bearing surface of the roller cutter being integral with said cutter and being made by tough-hardening an annealing resistant steel alloy having a carbon percentage exceeding 0.30 comprising surface-hardening the bearing surface of the roller cutter by means of a thermal hardening method, providing said bearing surface of said roller cutter with an inlay of a solid lubricant, and applying a wear resistant material on the bearing surface of the bearing pin in at least a lower load bearing fraction thereof, said wear resistant material having higher wearability than the surface-hardened bearing surface of the roller cutter.

2. A method according to claim 1, wherein the solid lubricant is a composite lubricant comprising molybdenum disulfide and a resin adhesive.

3. A method according to claim 2, wherein the resin adhesive is an epoxy resin adhesive and the lubricant contains 5-50 vol % molybdenum disulfide.

4. A method according to claim 1, comprising tough-hardening the roller cutter prior to the thermal surface-hardening thereof.

5. A method according to claim 4, comprising tough-hardening the bearing pin prior to the deposition of the wear resistant material thereon.

6. A method according to claim 1, comprising providing the rotary drill bit with a ball bearing for axial securing of the roller cutter on the bearing pin, providing the drill bit with a seal ring in a gap formed between the roller cutter and bit body, and surface-hardening by means of a thermal hardening method the ball races on the roller cutter and the bearing pin as well as the sealing surface of the seal ring against the bearing pin.

7. The method according to claim 1 wherein said thermal hardening method is high frequency surface-hardening.

8. The method according to claim 3 wherein said lubricant contains 10-35 vol % molybdenum disulfide.

9. The method according to claim 6 wherein said thermal hardening method is high frequency surface-hardening.

* * * * *